United States Patent
Aramaki et al.

(10) Patent No.: US 11,982,982 B2
(45) Date of Patent: May 14, 2024

(54) MANAGEMENT APPARATUS FOR MONITORING AND/OR CONTROLLING A FACILITY DEVICE

(71) Applicant: DAIKIN INDUSTRIES, LTD., Osaka (JP)

(72) Inventors: Tsuyoshi Aramaki, Osaka (JP); Takayuki Nakahara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/138,425

(22) Filed: Apr. 24, 2023

(65) Prior Publication Data

US 2023/0259090 A1    Aug. 17, 2023

Related U.S. Application Data

(63) Continuation of application No. PCT/JP2021/040828, filed on Nov. 5, 2021.

(30) Foreign Application Priority Data

Nov. 9, 2020    (JP) ................................ 2020-186280

(51) Int. Cl.
G05B 19/045    (2006.01)
G05B 19/042    (2006.01)
(Continued)

(52) U.S. Cl.
CPC .. G05B 19/042 (2013.01); *G05B 2219/24055* (2013.01); *G05B 2219/25076* (2013.01)

(58) Field of Classification Search
CPC ........ G05B 19/042; G05B 2219/24055; G05B 2219/25076
See application file for complete search history.

(56) References Cited

U.S. PATENT DOCUMENTS 7,421,321 B2 * 9/2008 Breed .................... G02B 27/01
                                                340/447
8,131,974 B2 * 3/2012 Nicholas ............. G06F 12/0862
                                                711/204
(Continued)

FOREIGN PATENT DOCUMENTS

CN         110462696 A     11/2019
JP         2012-42198 A     3/2012
(Continued)

OTHER PUBLICATIONS

International Search Report of corresponding PCT Application No. PCT/JP2021/040828 dated Dec. 28, 2021.
(Continued)

*Primary Examiner* — Brandon S Cole
(74) *Attorney, Agent, or Firm* — Global IP Counselors, LLP (57) ABSTRACT

A management apparatus monitors and/or controls a facility device. The management apparatus includes a setting unit, a storage unit, a determination unit, and an extraction unit. The setting unit sets association information associating identification information in order to specify a register used by the facility device with a data point regarding monitoring and/or control of the facility device. The storage unit stores history information that is association information previously set by the setting unit. The determination unit determines the use state of the register in the facility device. The extraction unit extracts the history information identical or similar to the use state of the register determined by the determination unit from the history information.

13 Claims, 11 Drawing Sheets

(51) Int. Cl.
*G05B 19/048* (2006.01)
*G05B 19/27* (2006.01)

(56) References Cited

U.S. PATENT DOCUMENTS

| | | | | |
|---|---|---|---|---|
| 2005/0283638 | A1* | 12/2005 | Kato | G06F 11/0793 |
| | | | | 714/2 |
| 2007/0110053 | A1* | 5/2007 | Soni | H04W 88/02 |
| | | | | 370/389 |
| 2010/0134611 | A1* | 6/2010 | Naruoka | G06F 18/00 |
| | | | | 382/103 |
| 2013/0246657 | A1* | 9/2013 | Hyo | H04L 67/565 |
| | | | | 709/246 |
| 2014/0282586 | A1* | 9/2014 | Shear | G06F 40/00 |
| | | | | 718/104 |
| 2015/0148966 | A1 | 5/2015 | Suzuki et al. | |
| 2016/0255139 | A1* | 9/2016 | Rathod | H04N 1/32101 |
| | | | | 709/203 |
| 2020/0018509 | A1 | 1/2020 | Nagahara et al. | |

FOREIGN PATENT DOCUMENTS

| | | |
|---|---|---|
| JP | 2013-225285 A | 10/2013 |
| JP | 2019-135599 A | 8/2019 |
| WO | 2013/145270 A1 | 10/2013 |

OTHER PUBLICATIONS

International Preliminary Report of corresponding PCT Application No. PCT/JP2021/040828 dated May 19, 2023.
European Search Report of corresponding EP Application No. 21 889 275.0 dated Mar. 13, 2024.

* cited by examiner

FIG. 1

| REGISTER | DATA NAME | VALUE | CONVERSION |
|---|---|---|---|
| 40001 | CHILLER STATE | ON | |
| 40010 | CHILLER CAPABILITY | 65 | |
| 40070 | OUTSIDE AIR TEMPERATURE | 25 | |
| 40100 | WATER TEMPERATURE | 70 | x0.1 |
| | | | |

FIG. 2A

| REGISTER | DATA NAME | VALUE | CONVERSION |
|---|---|---|---|
| 40001 | CHILLER STATE | ON | |
| 40010 | CHILLER CAPABILITY | 65 | |
| 40070 | OUTSIDE AIR TEMPERATURE | 25 | |
| 40100 | WATER TEMPERATURE | 70 | x0.1 |
| 40111 | COOLING WATER TEMPERATURE | 245 | x0.1 |

FIG. 2B

| REGISTER | CHILLER 201 |
|---|---|
| 40001 | ○ |
| 40002 | ○ |
| 40003 | ○ |
| 40004 | ○ |
| 40005 | E |
| 40006 | ○ |
| 40007 | ○ |
| 40008 | ○ |
| 40009 | E |
| 40010 | E |

FIG. 3

| REGISTER | CHILLER 301a | MANUAL WORK |
|---|---|---|
| 40001 | ○ | — |
| 40002 | ○ | — |
| 40003 | ○ | — |
| 40004 | E | ADDITION |
| 40005 | E | — |
| 40006 | ○ | — |
| 40007 | ○ | — |
| 40008 | ○ | — |
| 40009 | E | — |
| 40010 | E | — |

FIG. 4A

| REGISTER | CHILLER 301b | MANUAL WORK |
|---|---|---|
| 40001 | ○ | — |
| 40002 | ○ | — |
| 40003 | ○ | — |
| 40004 | ○ | — |
| 40005 | ○ | DELETION |
| 40006 | ○ | — |
| 40007 | ○ | — |
| 40008 | ○ | — |
| 40009 | E | — |
| 40010 | E | — |

FIG. 4B

| REGISTER | CHILLER 301c | MANUAL WORK |
|---|---|---|
| 40001 | ○ | — |
| 40002 | ○ | — |
| 40003 | ○ | — |
| 40004 | E | ADDITION |
| 40005 | ○ | DELETION |
| 40006 | E | ADDITION |
| 40007 | E | ADDITION |
| 40008 | E | ADDITION |
| 40009 | ○ | DELETION |
| 40010 | ○ | DELETION |

FIG. 4C

|  | TOTAL REGISTER NUMBER | REMAINING WORK (ADDITION) | REMAINING WORK (DELETION) | SIMILARITY (%) |
|---|---|---|---|---|
| CHILLER 301a | 8 | 1 | 0 | 87.5 |
| CHILLER 301b | 8 | 0 | 1 | 91.3 |
| CHILLER 301c | 10 | 4 | 3 | 39.0 |

| FACILITY DEVICE | MODEL | MANUFACTURER INFORMATION |
|---|---|---|
| CHILLER 301a | ××× | ××× |
| CHILLER 301b | ××× | ××× |
| CHILLER 301c | ××× | ××× |

FIG. 7

STORAGE UNIT 20

PREVIOUS TEST OPERATION RESULT

| REGISTER | CHILLER 301a |
|---|---|
| 40001 | ○ |
| 40002 | ○ |
| 40003 | ○ |
| 40004 | E |
| 40005 | E |
| 40006 | ○ |
| 40007 | ○ |
| 40008 | ○ |
| 40009 | E |
| 40010 | E |

| REGISTER | CHILLER 301b |
|---|---|
| 40001 | ○ |
| 40002 | ○ |
| 40003 | ○ |
| 40004 | ○ |
| 40005 | ○ |
| 40006 | ○ |
| 40007 | ○ |
| 40008 | ○ |
| 40009 | E |
| 40010 | E |

| REGISTER | CHILLER 301c |
|---|---|
| 40001 | ○ |
| 40002 | ○ |
| 40003 | ○ |
| 40004 | E |
| 40005 | ○ |
| 40006 | E |
| 40007 | E |
| 40008 | E |
| 40009 | ○ |
| 40010 | ○ |

FIG. 8

| REGISTER | CHILLER 302 |
|---|---|
| 40001 | ○ |
| 40002 | E |
| 40003 | ○ |
| 40004 | ○ |
| 40005 | E |
| 40006 | ○ |
| 40007 | ○ |
| 40008 | ○ |
| 40009 | E |
| 40010 | E |

FIG. 9

|  | TOTAL REGISTER NUMBER | REMAINING WORK (ADDITION) | REMAINING WORK (DELETION) | SIMILARITY (%) |
|---|---|---|---|---|
| CHILLER 301a | 8 | 1 | 1 | 78.8 |
| CHILLER 301b | 8 | 2 | 0 | 75.0 |
| CHILLER 301c | 10 | 4 | 4 | 32.0 |

FIG. 10

| FACILITY DEVICE | MODEL | MANUFACTURER INFORMATION | SIMILARITY (%) | REMAINING WORK (ADDITION) | REMAINING WORK (DELETION) |
|---|---|---|---|---|---|
| CHILLER 301a | ××× | ××× | 78.8 | 1 | 2 |
| CHILLER 301b | ××× | ××× | 75.0 | 1 | 0 |

FIG. 11A

| FACILITY DEVICE | MODEL | MANUFACTURER INFORMATION | SIMILARITY (%) | REMAINING WORK (ADDITION) | REMAINING WORK (DELETION) |
|---|---|---|---|---|---|
| CHILLER 301c | ××× | ××× | 32.0 | 4 | 4 |

MANAGEMENT APPARATUS FOR MONITORING AND/OR CONTROLLING A FACILITY DEVICE

CROSS-REFERENCE TO RELATED APPLICATIONS

This is a continuation of International Application No. PCT/JP2021/040828 filed on Nov. 5, 2021, which claims priority to Japanese Patent Application No. 2020-186280, filed on Nov. 9, 2020. The entire disclosures of these applications are incorporated by reference herein.

BACKGROUND

Technical Field

The present disclosure relates to a management apparatus that manages a facility device.

Background Art

There is a disclosure of a control device that registers the register information indicating the association relationship between the data acquired from a control target device or a sensor and the storage area of a register that stores the data Japanese Unexamined Patent Publication No. 2019-135599.

SUMMARY

A management apparatus according to a first aspect is a management apparatus that monitors and/or controls a facility device and includes a setting unit, a storage unit, a determination unit, and an extraction unit. The setting unit sets association information that is information associating identification information for specifying a register used by the facility device with a data point regarding monitoring and/or control of the facility device. The storage unit stores history information that is the association information previously set by the setting unit. The determination unit determines a use state of the register in the facility device. The extraction unit extracts history information identical or similar to the use state of the register determined by the determination unit from the history information.

DETAILED DESCRIPTION OF EMBODIMENT(S)

First Embodiment (1) Overall Configuration

Figure 1:
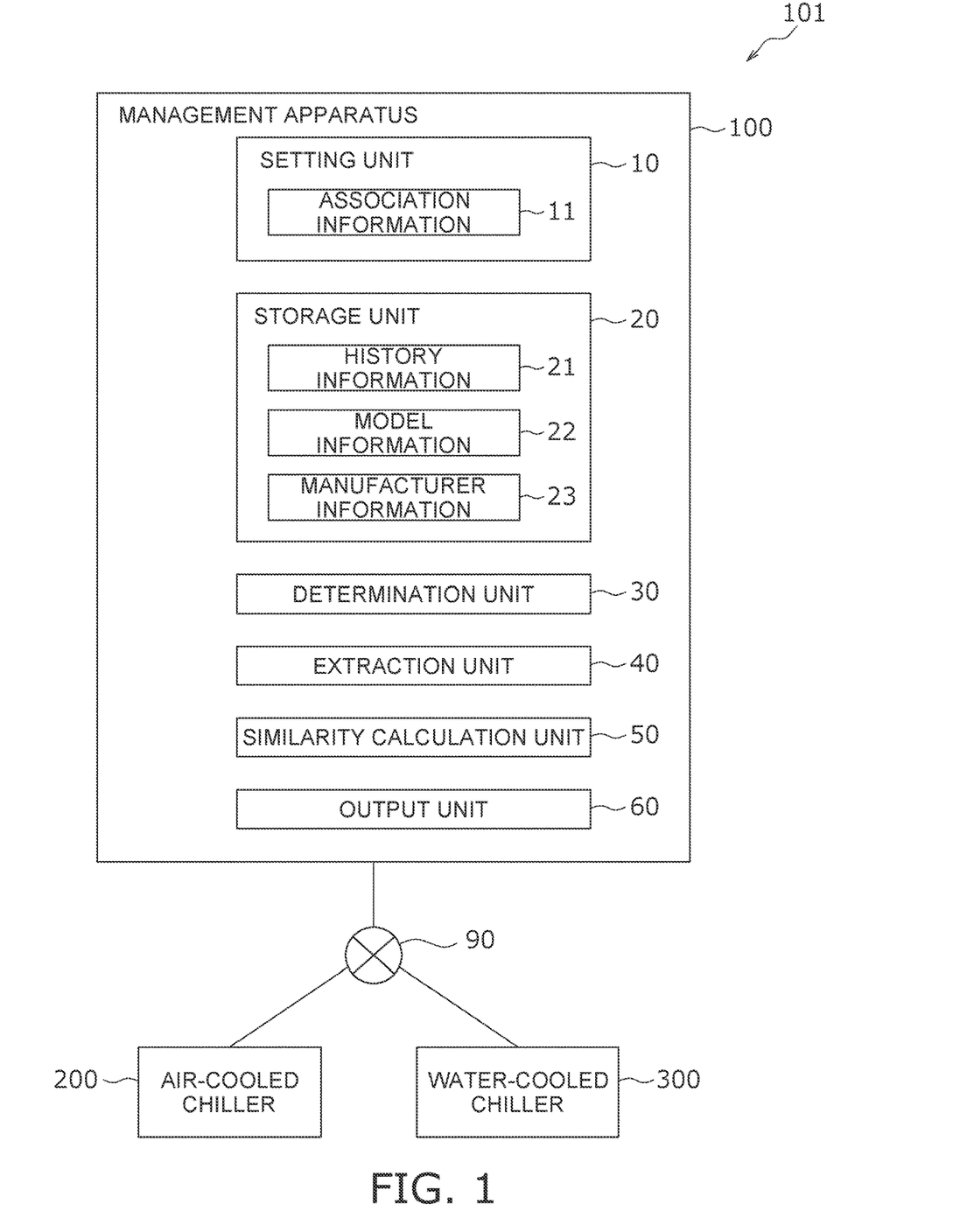
FIG. 1 is a functional block diagram of a management system.

As illustrated in FIG. 1, a management system 101 includes a plurality of facility devices and a management apparatus (monitoring control device) 100.

The management apparatus 100 includes a setting unit 10, a storage unit 20, a determination unit 30, an extraction unit 40, a similarity calculation unit 50, an output unit 60, and a control calculation unit (not illustrated).

The management apparatus 100 communicates with a plurality of facility devices via a network 90. The plurality of facility devices refers to air conditioners, and the like.

A monitoring control device (building automation system (BAS)) is installed as a host system of an air conditioner, or the like, to monitor and control the facility device from outside.

One of the methods for monitoring the facility device by the host system is a method using communications such as Modbus. The monitoring control device reads and writes data from and to the data point of the facility device to monitor the data. Further, when the facility device is delivered, a builder on the site performs a test operation and sets the data point needed for monitoring for each property.

According to the present embodiment, the Modbus connection is established among the management apparatus 100, an air-cooled chiller 200, and a water-cooled chiller 300. The air-cooled chiller 200 and the water-cooled chiller 300 are examples of the plurality of facility devices.

(2) Detailed Configuration (2-1) Management Apparatus

The management apparatus 100 is implemented by a computer. The management apparatus 100 includes the setting unit 10, the storage unit 20, the determination unit 30, the extraction unit 40, the similarity calculation unit 50, the output unit 60, and the control calculation unit (not illustrated). A processor such as a CPU or a GPU may be used as the control calculation unit. The control calculation unit reads programs stored in the storage unit 20 and performs predetermined image processing and calculation processing in accordance with the programs. Further, the control calculation unit may write calculation results in the storage unit 20 and read information stored in the storage unit 20 in accordance with the program. FIG. 1 illustrates various functional blocks implemented by the control calculation unit. The storage unit 20 may be used as a database.

(2-1-1) Setting Unit

The setting unit 10 sets association information 11 that is information associating identification information for specifying a register used by the facility device with a data point regarding monitoring and/or control of the facility device. The association information 11 includes a conversion rule for converting the data acquired from the facility device into data suitable for monitoring and/or controlling the facility device.

The setting unit 10 sets history information 21 extracted by the extraction unit 40 as the association information 11 of the facility device.

(2-1-2) Storage Unit

The storage unit 20 stores the history information 21 that is the association information 11 previously set by the setting unit 10. The storage unit 20 stores the history information 21 in association with at least manufacturer information 23 of the facility device. Further, the storage unit 20 stores the history information 21 in association with model information 22 of the facility device.

(2-1-3) Determination Unit

The determination unit 30 determines the use state of the register in the facility device. The determination unit 30 sends a request for the data stored for each piece of identification information to the facility device and determines the use state of the register based on a response from the facility device to the request.

(2-1-4) Extraction Unit

The extraction unit 40 extracts the history information 21 identical or similar to the use state of the register determined by the determination unit 30 from the history information 21. The extraction unit 40 extracts the history information 21 having the identical or similar use state of the register from the history information 21 of the facility device having the identical manufacturer information 23. The extraction unit 40 extracts the history information 21 having the highest similarity from the history information 21.

(2-1-5) Similarity Calculation Unit

The similarity calculation unit 50 compares the association information 11 of the facility device with the history information 21 to calculate the similarity of the use state of the register. The similarity calculation unit 50 calculates the similarity based on the number of pieces of data to be newly added to the facility device and the number of pieces of data to be deleted from the facility device, which are obtained by comparing the association information 11 of the facility device with the history information 21.

The similarity calculation unit 50 uses Equation 11 below to calculate the similarity.

Similarity=(total number of registers−(number of pieces of data to be added×1+number of pieces of data to be deleted×0.7))/total number of registers    Equation 11:

The weight parameter for deletion "×0.7" is given to the number of pieces of data to be deleted. The weight parameter for the number of pieces of data to be added is "×1". The weight parameter is changed by the builder.

(2-1-6) Output Unit

The output unit 60 outputs any of the history information 21 extracted by the extraction unit 40, the manufacturer information 23 and the model information 22 associated with the history information 21, and the similarity calculated by the similarity calculation unit 50.

(2-2) Air-Cooled Chiller

The air-cooled chiller 200 is an air-cooled chiller of Company A. The builder previously performed a test operation on the air-cooled chiller 200. The storage unit 20 stores test operation results of the air-cooled chiller 200.

Figure 2A:
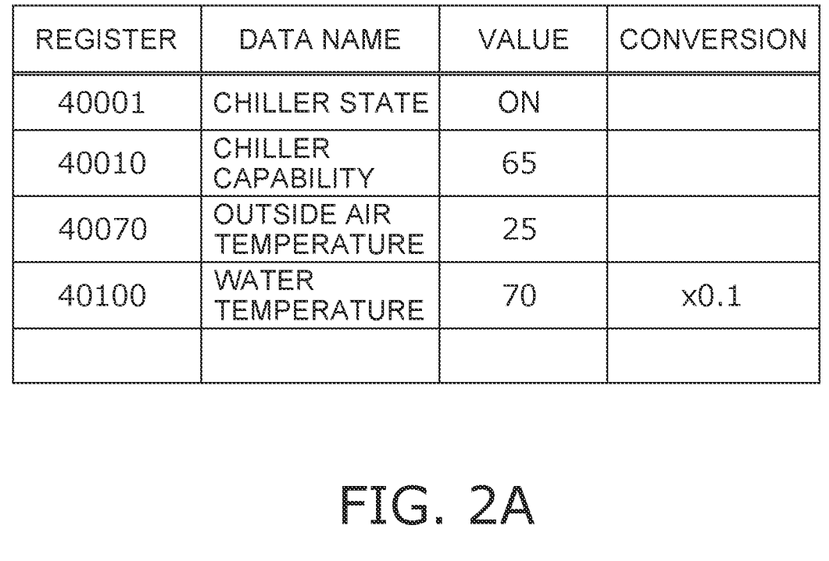
FIG. 2A is a table illustrating an example of a communication specification of an air-cooled chiller.

FIG. 2A illustrates an example of a communication specification of the air-cooled chiller 200.

The air-cooled chiller 200 includes registers 40001, 40010, 40070, and 40100.

The register 40001 has data on the chiller state. The chiller state is ON. The register 40010 has data on the chiller capability. The chiller capability is 65. The register 40070 has data on the outside air temperature. The outside air temperature is 25. The register 40100 has data on the water temperature. The water temperature is 70.

The conversion rule converts the data acquired from the facility device into data suitable for monitoring or controlling the facility device.

The conversion rule for the data on the water temperature of the air-cooled chiller 200 is "×0.1". "×0.1" refers to 0.1 times.

(2-3) Water-Cooled Chiller

The water-cooled chiller 300 is a water-cooled chiller of Company B. The similarity calculation unit 50 compares the data map of the water-cooled chiller 300 with the test operation result of the air-cooled chiller 200.

Figure 2B:
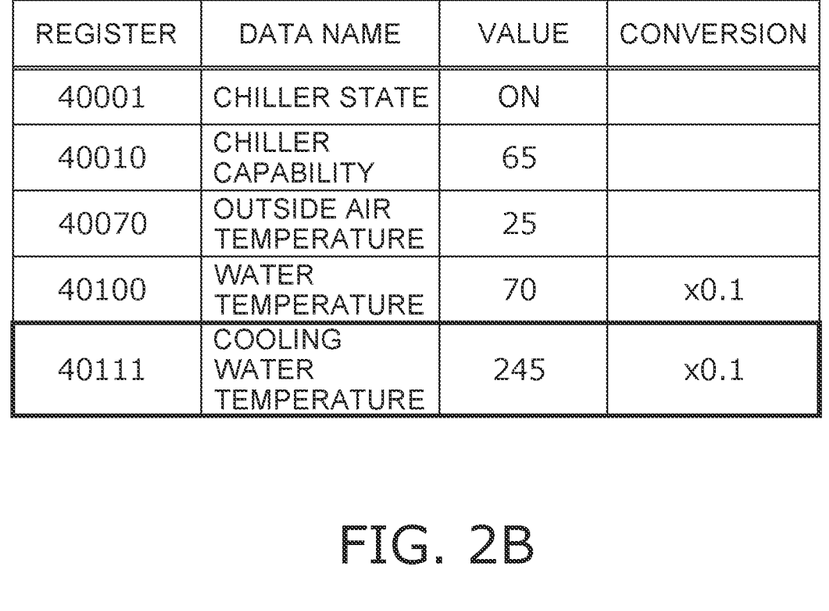
FIG. 2B is a table illustrating an example of a communication specification of a water-cooled chiller.

FIG. 2B illustrates an example of a communication specification of the water-cooled chiller 300.

The register 40001 has data on the chiller state. The chiller state is ON. The register 40010 has data on the chiller capability. The chiller capability is 65. The register 40070 has data on the outside air temperature. The outside air temperature is 25. The register 40100 has data on the water temperature. The water temperature is 70. A register 40111 has data on the cooling water temperature. The cooling water temperature is 245.

The conversion rule for the data on the water temperature of the water-cooled chiller 300 is "×0.1". Further, the conversion rule for data on the cooling water temperature of the water-cooled chiller 300 is "×0.1".

(3) Test Operation of Facility Device

According to the present embodiment, the management apparatus 100 is installed for the air-cooled chiller 200 and the water-cooled chiller 300. The management apparatus 100 monitors five data points for the air-cooled chiller 200 and the water-cooled chiller 300 by the Modbus communication. The five data points are chiller state, chiller capability, outside air temperature, water temperature, and cooling water temperature.

The builder previously performed a test operation on the air-cooled chiller 200. The storage unit 20 stores the history information 21, the conversion rule (not illustrated), the model information 22, and the manufacturer information 23 as test operation results of the air-cooled chiller 200. The history information 21 is a result of association between the data point and an address (register).

Afterward, when the water-cooled chiller 300 of Company B is subjected to a test operation in another property, the setting unit 10 scans all the registers included in the water-cooled chiller 300. Accordingly, the setting unit 10 acquires the association information (data map) 11 of the water-cooled chiller 300.

The similarity calculation unit 50 compares the association information 11 of the water-cooled chiller 300 to be subjected to a test operation with the history information 21 of the air-cooled chiller 200 previously subjected to a test operation to calculate the similarity.

When the association result between the data point and the address of the air-cooled chiller 200 may be reused for the test operation setting of the water-cooled chiller 300, the data point and the address of the water-cooled chiller 300 are automatically associated by reusing the association result between the data point and the address of the air-cooled chiller 200.

When the association information 11 of the water-cooled chiller 300 is not completely identical to the history information 21 of the air-cooled chiller 200 previously subjected to a test operation, the builder manually inputs data for the excess or deficiency of the data of the water-cooled chiller 300. Regarding the water-cooled chiller 300, it is possible to reduce the number of works for the test operation setting for the automatically associated data points.

(4) Method for Calculating Similarity

FIGS. 3 and 4A to 4C are tables illustrating a method for calculating the similarity. A test operation of a chiller 201 has already been completed. Chillers 301a to 301c are chillers of new models.

Figure 3:
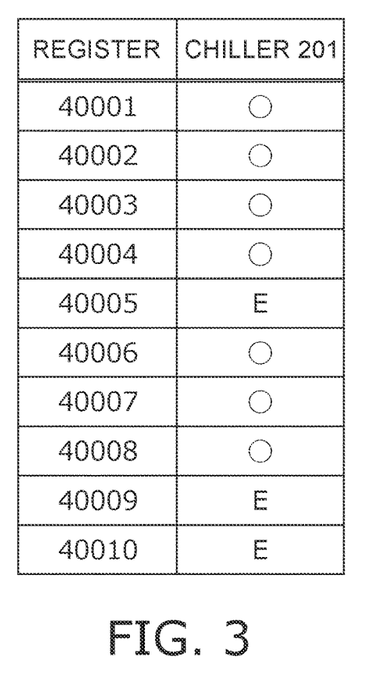
FIG. 3 is a table illustrating a method for calculating similarity.

First, all the data map of the chiller 201, for which the test operation has already been completed, is scanned. For the chiller 201, requests for data values are sequentially sent to all the registers in the data map. When the requested register stores data, the data value of the register is returned. When the requested register does not exist or the requested register stores no data, an error is returned.

FIG. 3 illustrates the data map of the chiller 201. As illustrated in FIG. 3, the chiller 201 includes the registers 40001 to 40010. The registers 40001 to 40004 and 40006 to 40008 of the chiller 201 store data. The registers 40005, 40009, and 40010 of the chiller 201 store no data.

Figure 4A:
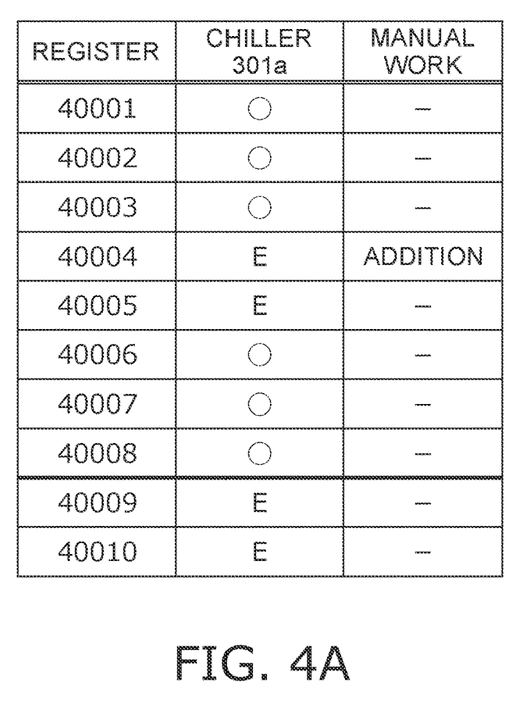
FIG. 4A is a table illustrating a method for calculating similarity.
Figure 4B:
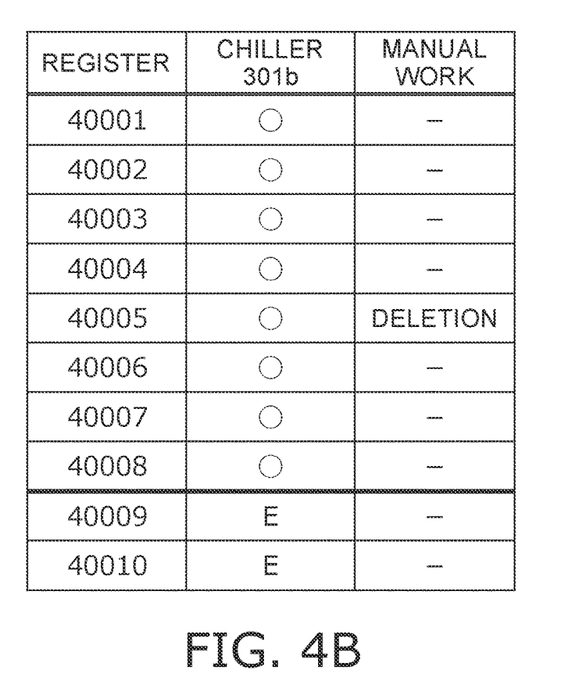
FIG. 4B is a table illustrating a method for calculating similarity.
Figure 4C:
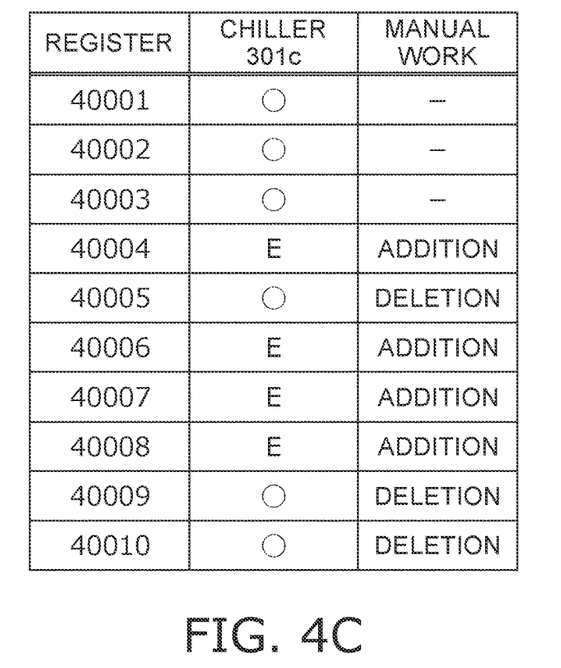
FIG. 4C is a table illustrating a method for calculating similarity.

Next, all the data map is scanned for the chillers 301a to 301c of the new models so that the data map of the chillers 301a to 301c is compared with the test operation result of the chiller 201 previously subjected to a test operation.

FIG. 4A illustrates the data map of the chiller 301a of the new model. As illustrated in FIG. 4A, the chiller 301a includes the registers 40001 to 40008. The total number of the registers of the chiller 301a is "8".

The registers 40001 to 40003 and 40006 to 40008 of the chiller 301a store data. The registers 40004, 40005, 40009, and 40010 of the chiller 301a store no data.

The data map of the chiller 301a is compared with the test operation result of the chiller 201 previously subjected to a test operation.

With regard to the register 40004, data is stored in the chiller 201. Conversely, with regard to the register 40004, data is not stored in the chiller 301a. Therefore, in the chiller 301a, the number of pieces of data to be manually added is "1".

With regard to the registers 40001 to 40003, 40007, and 40008, data is stored in both the chiller 201 and the chiller 301a. Therefore, the number of pieces of data to be manually deleted for the chiller 301a is "0".

With regard to the register 40005, data is stored in neither the chiller 201 nor the chiller 301a.

From the above, the remaining work for the communication setting of the chiller 301a is "1 data addition".

Next, FIG. 4B illustrates the data map of the chiller 301b of the new model. As illustrated in FIG. 4B, the chiller 301b includes the registers 40001 to 40008. The total number of the registers of the chiller 301b is "8".

The registers 40001 to 40008 of the chiller 301b store data. The registers 40009 and 40010 of the chiller 301b store no data.

The data map of the chiller 301b is compared with the test operation result of the chiller 201 previously subjected to a test operation.

With regard to the register 40005, data is stored in the chiller 201. Conversely, with regard to the register 40005, data is stored in the chiller 301b. Therefore, the number of pieces of data to be manually deleted for the chiller 301b is "1".

With regard to the registers 40001 to 40004 and 40006 to 40008, data is stored in both the chiller 201 and the chiller 301a. Therefore, the number of pieces of data to be manually added for the chiller 301b is "0".

From the above, the remaining work for the communication setting of the chiller 301b is "1 data deletion".

Next, FIG. 4C illustrates the data map of the chiller 301c of the new model. As illustrated in FIG. 4C, the chiller 301c includes the registers 40001 to 40010. The total number of the registers in the chiller 301c is "10".

The registers 40001 to 40003, 40005, 40009, and 40010 of the chiller 301c store data. The registers 40004 and 40006 to 40008 of the chiller 301c store no data.

The data map of the chiller 301c is compared with the test operation result of the chiller 201 previously subjected to a test operation.

With regard to the registers 40004 and 40006 to 40008, data is stored in the chiller 201. Conversely, with regard to the registers 40004 and 40006 to 40008, no data is stored in the chiller 301c. Therefore, the number of pieces of data to be manually added for the chiller 301c is "4".

With regard to the registers 40005, 40009, and 40010, no data is stored in the chiller 201. Conversely, with regard to the registers 40005, 40009, and 40010, data is stored in the chiller 301c. Therefore, the number of pieces of data to be manually deleted for the chiller 301c is "3".

From the above, the remaining work for the communication setting of the chiller 301c is "4 data addition" and "3 data deletion".

Figure 5:
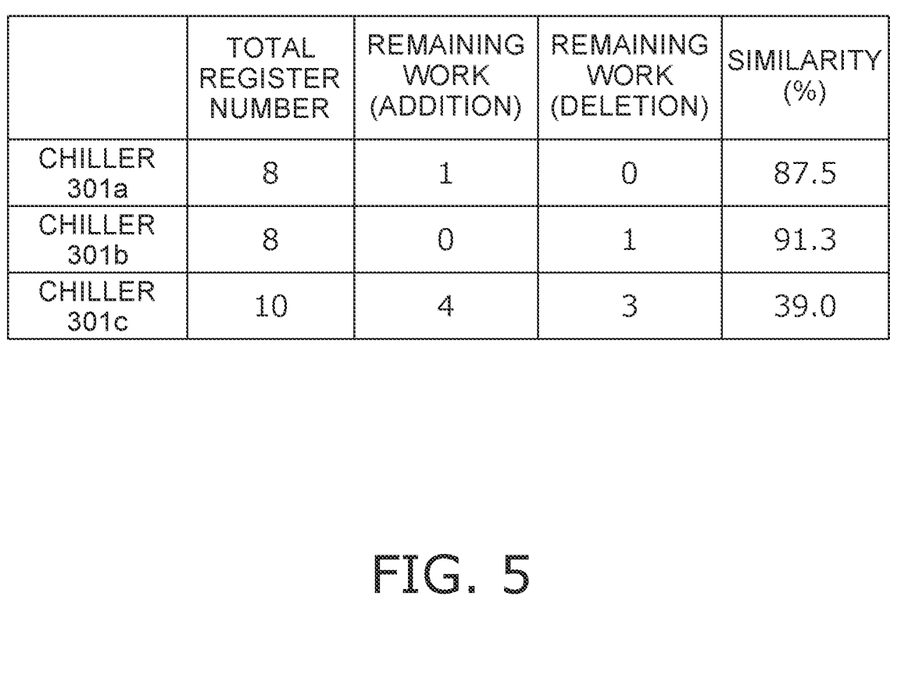
FIG. 5 is a table illustrating comparison results between a test operation result of a chiller 201 and data maps of chillers 301a, 301b, 301c.

FIG. 5 illustrates comparison results between the test operation result of the chiller 201 and the data maps of the chillers 301a, 301b, 301c.

According to the present embodiment, when the similarity with the chiller 201 is 70% or more, the reuse of the test operation result of the chiller 201 is strongly recommended. When the similarity with the chiller 201 is less than 30%, the reuse of the test operation result of the chiller 201 is not recommended. When the similarity with the chiller 201 is 30% or more and less than 70%, the reuse of the test operation result of the chiller 201 is weakly recommended.

With regard to the chiller 301a, the similarity with the chiller 201 is 87.5% as calculated by using Equation 11. For the communication setting of the chiller 301a, the reuse of the test operation result of the chiller 201 is strongly recommended.

With regard to the chiller 301b, the similarity with the chiller 201 is 91.3% as calculated by using Equation 11. For the communication setting of the chiller 301b, the reuse of the test operation result of the chiller 201 is strongly recommended.

With regard to the chiller 301c, the similarity with the chiller 201 is 39.0% as calculated by using Equation 11. For the communication setting of the chiller 301c, the reuse of the test operation result of the chiller 201 is weakly recommended.

(5) Overall Operation

Figure 6A:
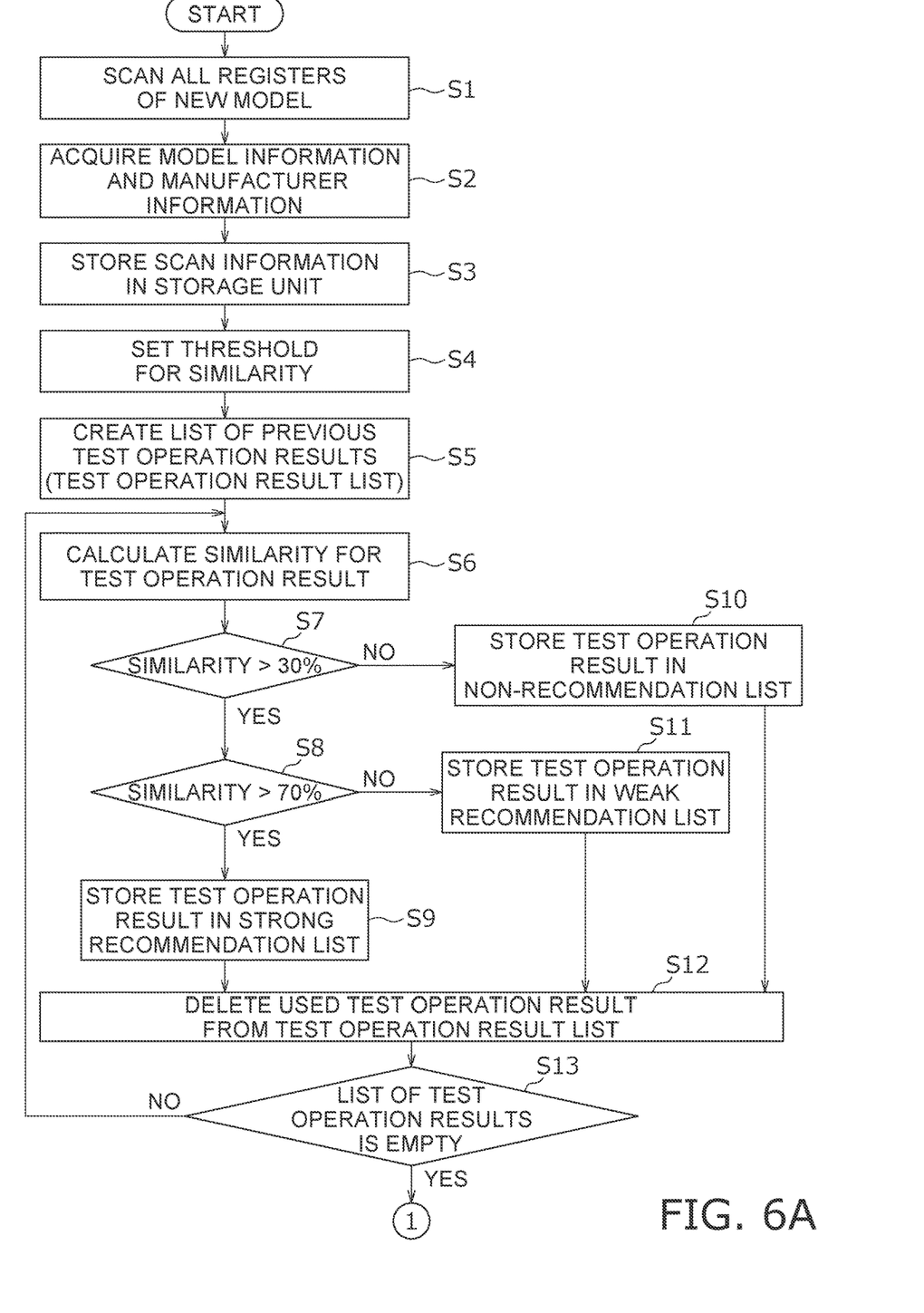
FIG. 6A is a flowchart of the management system.
Figure 6B:
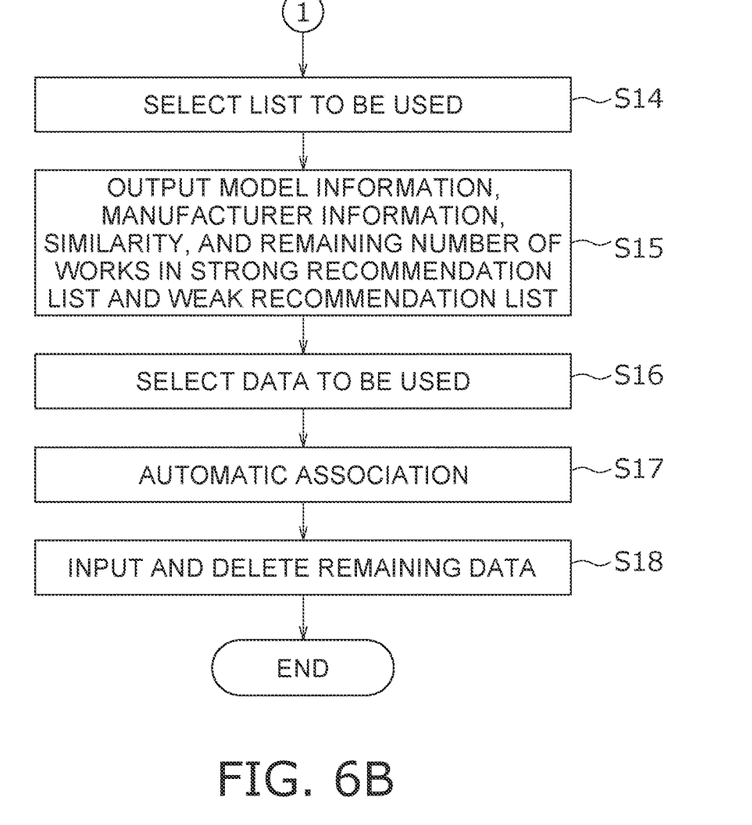
FIG. 6B is a flowchart of the management system.

FIGS. 6A and 6B is a flowchart of the management system 101.

First, all the registers of the chiller 302 of the new model are scanned (Step S1).

Figure 9:
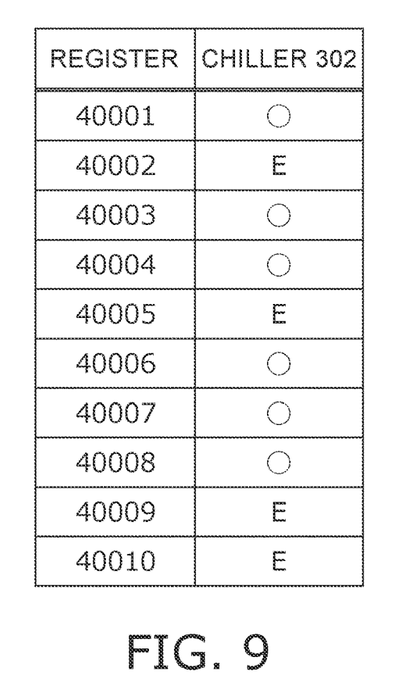
FIG. 9 is a table illustrating an example of all scan information of a new model.

FIG. 9 illustrates all scan information of the chiller 302 of the new model. The chiller 302 includes the registers 40001 to 40010. The registers 40001, 40003, 40004, and 40006 to 40008 of the chiller 302 store data. The registers 40002, 40005, 40009, and 40010 of the chiller 302 store no data.

The model information and the manufacturer information of the chiller 302 are acquired (Step S2). The scan information of the chiller 302 is stored in the storage unit 20 (Step S3).

A threshold for the similarity between the scan information of the chiller 302 of the new model and the previous test operation result is set in the similarity calculation unit 50 (Step S4). The threshold of the similarity is determined by the builder for each property. The threshold for the similarity for determining whether to store the test operation result in a non-recommendation list is set to 30%, and the threshold for the similarity for determining whether to store the test operation result in a strong recommendation list or a weak recommendation list is set to 70%.

A test operation result list is created for the previous test operation result (Step S5).

Figure 7:
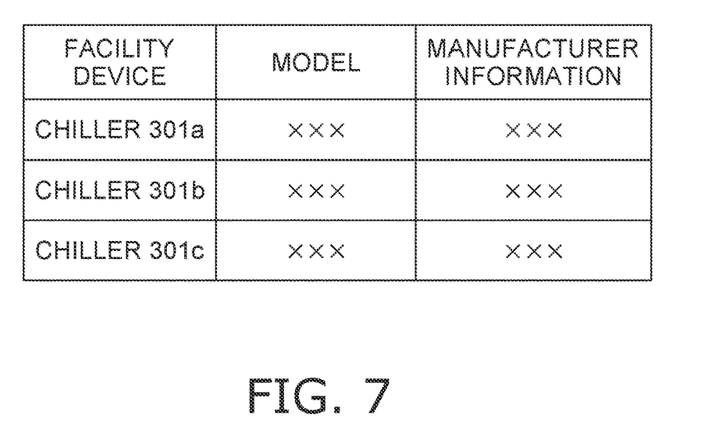
FIG. 7 is a table illustrating an example of a test operation result list.

FIG. 7 illustrates an example of the test operation result list. As illustrated in FIG. 7, the test operation result list includes the model and the manufacturer information of the facility device previously subjected to a test operation. The facility devices previously subjected to a test operation are the chiller 301a, the chiller 301b, and the chiller 302c.

Figure 8:
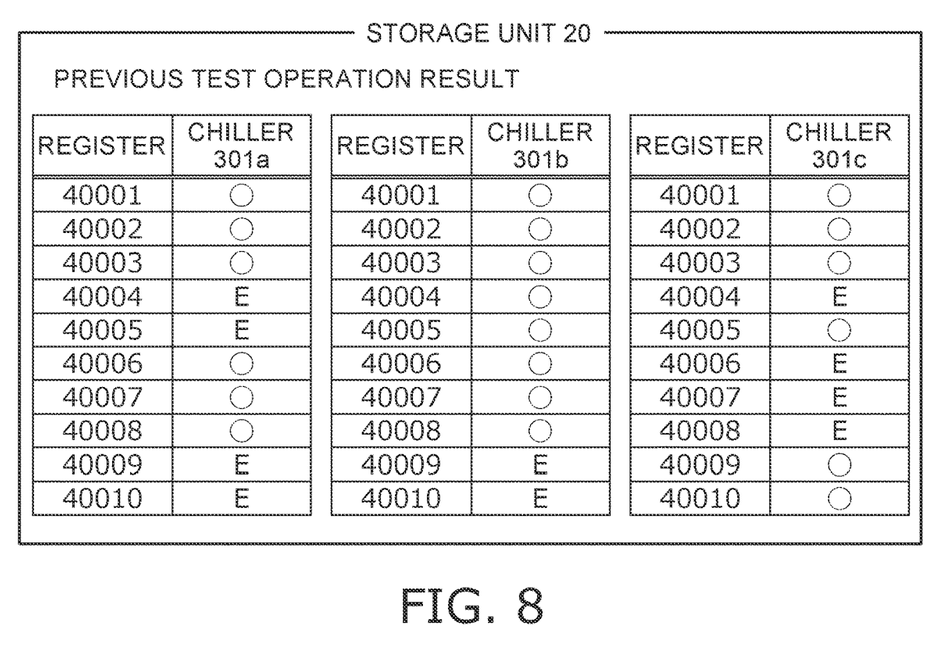
FIG. 8 is a table illustrating an example of previous test operation results.

FIG. 8 illustrates the test operation results of the facility devices previously subjected to a test operation. The storage unit 20 stores the test operation results of the chiller 301a, the chiller 301b, and the chiller 302c previously subjected to a test operation.

The chiller 301a includes the registers 40001 to 40010. The registers 40001 to 40003 and 40006 to 40008 of the chiller 301a store data. The registers 40004, 40005, 40009, and 40010 of the chiller 301a store no data.

The chiller 301b includes the registers 40001 to 40010. The registers 40001 to 40008 of the chiller 301b store data. The registers 40009 and 40010 of the chiller 301b store no data.

The chiller 301c includes the registers 40001 to 40010. The registers 40001 to 40003, 40005, 40009, and 40010 of the chiller 301c store data. The registers 40004 and 40006 to 40008 of the chiller 301c store no data.

Figure 10:
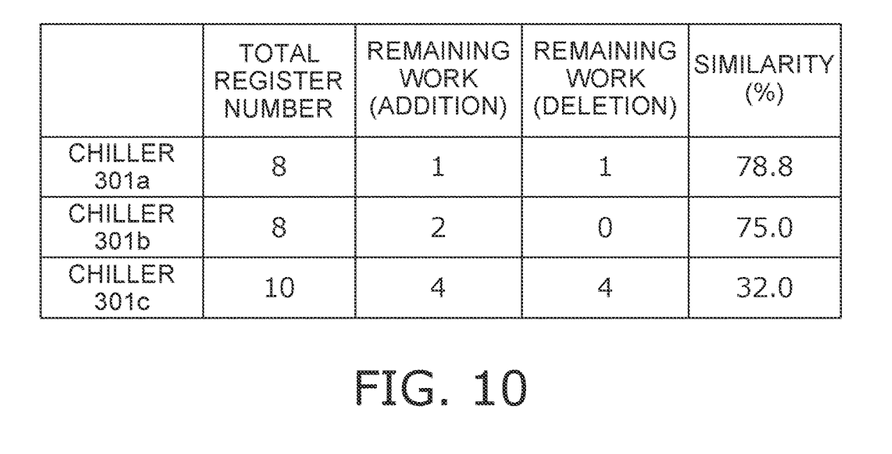
FIG. 10 is a table illustrating comparison results between test operation results of chillers 301a, 301b, 301c and a data map of a chiller 302.

FIG. 10 illustrates the comparison results between the test operation results of the chillers 301a, 301b, 301c previously subjected to a test operation and the data map of the chiller 302.

Based on the comparison between the chiller 301a and the chiller 302, the register 40002 of the chiller 301a store data, while the register 40002 of the chiller 302 store no data. Therefore, the remaining work is "1 data addition".

The register 40004 of the chiller 301a stores no data, while the register 40004 of the chiller 302 stores data. Therefore, the remaining work is "1 data deletion".

Based on the comparison between the chiller 301b and the chiller 302, the registers 40002 and 40005 of the chiller 301b store data, while the registers 40002 and 40005 of the chiller 302 store no data. Therefore, the remaining work is "2 data addition".

Based on the comparison between the chiller 301c and the chiller 302, the registers 40002, 40005, 40009, and 40010 of the chiller 301c store data, while the registers 40002, 40005, 40009, and 40010 of the chiller 302 store no data. Therefore, the remaining work is "4 data addition".

The registers 40004 and 40006 to 40008 of the chiller 301c store no data, while the registers 40004 and 40006 to 40008 of the chiller 302 store data. Therefore, the remaining work is "4 data deletion".

Subsequently, in Step S6, the similarity is calculated for the test operation results in the test operation result list.

It is determined whether the similarity calculated in Step S6 is 30% or more (Step S7). When the similarity is less than 30% (No in Step S7), the test operation result is stored in the non-recommendation list (Step S10). When the similarity is 30% or more (Yes in Step S7), the process proceeds to Step S8.

When the similarity is 70% or more (Yes in Step S8), the test operation result is stored in the strong recommendation list (Step S9). When the similarity is less than 70% (No in Step S8), the test operation result is stored in the weak recommendation list (Step S11).

The used test operation result is deleted from the test operation result list (Step S12).

A comparison with the test operation result of the chiller 301a in the test operation result list of FIG. 7 will be described. In Step S6, the similarity is calculated using Equation 11 for the test operation result of the chiller 301a. As the similarity is 78.8% and the similarity is 30% or more (Yes in Step S7), the process proceeds to Step S8. Further, as the similarity is 78.8% and the similarity is 70% or more (Yes in Step S8), the test operation result of the chiller 301a is stored in the strong recommendation list (Step S9). The test operation result of the chiller 301a is deleted from the test operation result list.

In FIG. 6A, it is determined whether the list of test operation results is empty (Step S13). When the list of test operation results is not empty (No in Step S13), the process returns to Step S6.

Steps S6 to S12 are also performed for the chiller 301b and the chiller 301c in the test operation result list of FIG. 7.

The similarity of the chiller 301b is 75.0%, and the test operation result of the chiller 301b is stored in the strong recommendation list. The similarity of the chiller 301c is 32.0%, and the test operation result of the chiller 301c is stored in the weak recommendation list.

After comparing with the test operation results of the chillers 301a to 301c, when the test operation result list is empty (Yes in Step S13), the list to be used by the builder is selected (Step S14).

The model information 22, the manufacturer information 23, the similarity, and the remaining number of works in the strong recommendation list and the weak recommendation list are output (Step S15).

Figure 11A:
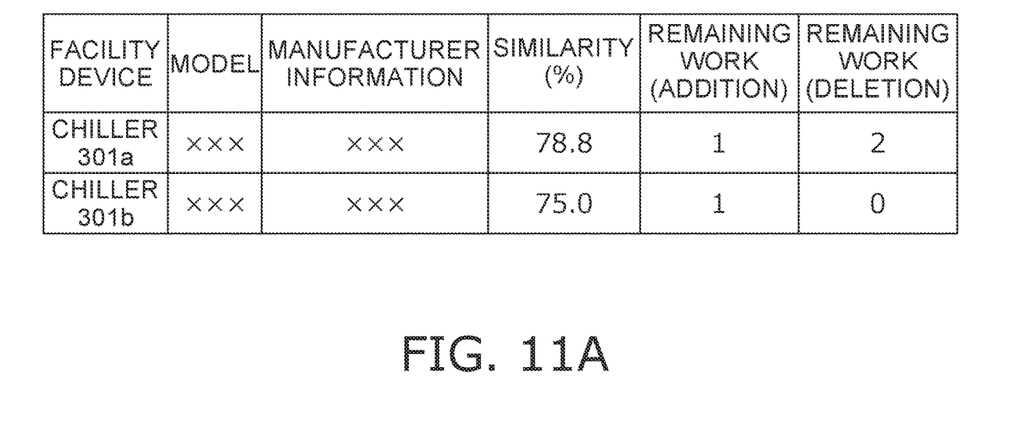
FIG. 11A is a table illustrating an example of a strong recommendation list.
Figure 11B:
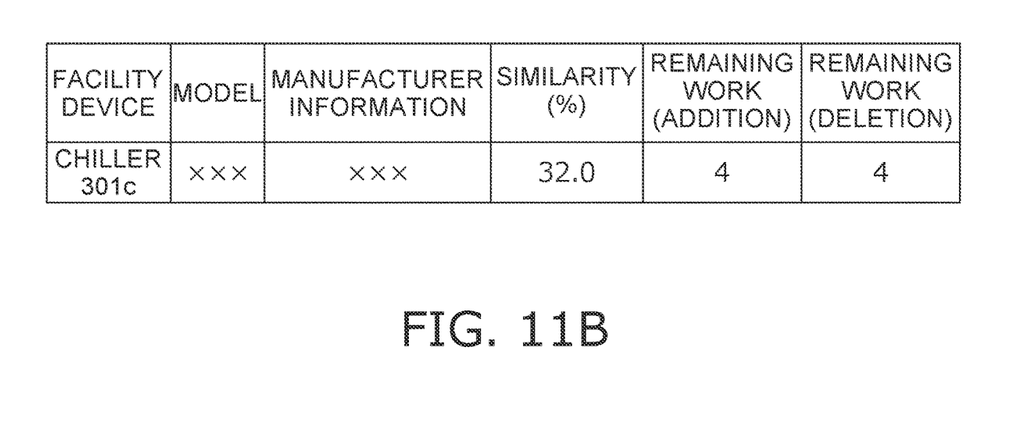
FIG. 11B is a table illustrating an example of a weak recommendation list.

FIG. 11A illustrates the strong recommendation list. The strong recommendation list includes the chiller 301a and the chiller 301b. FIG. 11B illustrates the weak recommendation list. The weak recommendation list includes the chiller 301c.

The data used by the builder is selected from the strong recommendation list and the weak recommendation list (Step S16). According to the present embodiment, the test operation result of the chiller 301a having the highest similarity in the strong recommendation list is selected.

By reusing the test operation result of the chiller 301a, the data point and the address are automatically associated in the communication setting of the chiller 302 (Step S17).

After the data point and the address of the chiller 302 are automatically associated in Step S17, the remaining data is input or deleted (Step S18). When the test operation result of the chiller 301a is selected, the remaining number of works is "1 data addition" and "1 data deletion".

(6) Feature (6-1)

The management apparatus 100 according to the present embodiment monitors and/or controls a facility device, and the management apparatus 100 includes the setting unit 10, the storage unit 20, the determination unit 30, and the extraction unit 40. The setting unit 10 sets the association information 11 that is the information associating the identification information for specifying the register used by the facility device with the data point regarding monitoring and/or control of the facility device. The storage unit 20 stores the history information 21 that is the association information 11 previously set by the setting unit 10. The determination unit 30 determines the use state of the register in the facility device. The extraction unit 40 extracts the history information 21 identical or similar to the use state of the register determined by the determination unit 30 from the history information 21.

As the management apparatus 100 extracts the history information 21 identical or similar to the use state of the register, it is possible to determine whether there is a data map similar to the data map of the facility device previously connected for communication.

Conventionally, when monitoring or control is conducted on a facility device of another company by the Modbus connection, or the like, from the BAS of the company of its own, the model number of the target facility device is checked and the communication specification is obtained each time. Then, the communication connection between the BAS and the facility device is established by performing the communication setting on the BAS based on the information of the communication specification.

At this time, when the model of the facility device previously subjected to a test operation is the same as the model of the facility device to be subjected to the communication setting, their data maps are similar. Therefore, for the communication setting of the facility device, it is possible to reuse the previous test operation result stored in the cloud based on the model information.

However, with even different model numbers, the Modbus data maps are often similar. When it is not possible to determine whether the Modbus data maps are similar, it is difficult to reuse the existing setting information.

In the management apparatus 100, immediately after the Modbus connection is established, all the registers of the facility device are scanned, and the information on the register use area, the stored value, and the valid state of the register is collected. Then, a comparison is made with the history information scanned for the facility device previously subjected to a test operation, the profile having a high degree of coincidence is regarded as the profile of the same model, and the communication setting of the facility device previously subjected to a test operation is reused.

With the management apparatus 100, for the model for which the Modbus connection was previously established once or the model having a data map similar to the above model, a reduction in the number of works for establishing the Modbus connection may be expected without being affected by differences in properties and workers.

Further, as it is possible to accumulate the data indicating which model has been delivered to which property, it is possible to contribute to services such as follow-up.

(6-2)

In the management apparatus 100 according to the present embodiment, the setting unit 10 sets the history information 21 extracted by the extraction unit 40 as the association information 11 of the facility device.

In the management apparatus 100, as the history information 21 is set as the association information 11 of the facility device, it is possible to use the association information of the facility device previously connected for communication.

(6-3)

In the management apparatus 100 according to the present embodiment, the association information 11 includes the conversion rule for converting the data acquired from the facility device into data suitable for monitoring and/or controlling the facility device.

In the management apparatus 100, as the association information 11 includes the conversion rule for converting the data acquired from the facility device, the data suitable for monitoring or controlling the facility device may be acquired.

(6-4)

In the management apparatus 100 according to the present embodiment, the determination unit 30 sends the request for the data stored for each piece of identification information to the facility device and determines the use state of the register based on a response from the facility device to the request.

In the management apparatus 100, as the request is sent for the data stored for each piece of identification information to the facility device, the use state of the register of the facility device may be acquired.

(6-5)

In the management apparatus 100 according to the present embodiment, the storage unit 20 stores the history information in association with at least the manufacturer information 23 of the facility device. The extraction unit 40 extracts the history information 21 having the identical or similar use state of the register from the history information 21 of the facility device having the identical manufacturer information 23.

In the management apparatus 100, as the history information 21 and the manufacturer information 23 of the facility device are stored in association with each other, it is possible to acquire the history information 21 of the facility device that is of the identical manufacturer and that was previously connected for communication.

(6-6)

In the management apparatus 100 according to the present embodiment, the storage unit 20 stores the history information 21 in association with the model information 22 of the facility device.

In the management apparatus 100, as the history information 21 is stored in association with the model information 22 of the facility device, the setting information of the facility device may be used by referring to the model information 22.

(6-7)

The management apparatus 100 according to the present embodiment further includes the similarity calculation unit 50 that compares the association information 11 of the facility device with the history information 21 to calculate the similarity of the use state of the register. The extraction unit 40 extracts the history information 21 having the highest similarity from the history information 21.

As the management apparatus 100 compares the association information 11 of the facility device with the history information 21 to calculate the similarity of the use state of the register, the history information having the highest degree of coincidence may be selected from the facility devices previously connected for communication.

(6-8)

In the management apparatus 100 according to the present embodiment, the similarity calculation unit 50 calculates the similarity based on the number of pieces of data to be newly added to the facility device and the number of pieces of data to be deleted from the facility device, which are obtained by comparing the association information 11 of the facility device with the history information 21.

As the management apparatus 100 calculates the similarity based on the number of pieces of data to be newly added to the facility device and the number of pieces of data to be deleted from the facility device, it is possible to determine whether the history information of the facility device previously set for communication may be used.

(6-9)

The management apparatus 100 according to the present embodiment further includes the output unit 60 that outputs any of the history information 21 extracted by the extraction unit 40, the manufacturer information 23 and the model information 22 associated with the history information 21, and the similarity calculated by the similarity calculation unit 50.

The management apparatus 100 may present the user with the information on the facility device previously connected for communication.

(7) Modification (7-1) Modification 1A

According to the present embodiment, the case of the Modbus connection of the facility device is described, but it is possible to reuse the communication setting of the model previously subjected to a test operation even in the case of the connection by other communication protocols such as BACnet.

(7-2) Modification 1B

In the case described according to the present embodiment, the test operation result of the facility device having the highest similarity in the strong recommendation list is selected, but is not limited thereto. For example, the desired test operation result to be used by the builder may be determined from the strong recommendation list.

(7-3) Modification 1C

In the case described according to the present embodiment, the management apparatus 100 includes the storage unit 20, the extraction unit 40, and the similarity calculation unit 50, but is not limited thereto. A server device (cloud server) may include a storage unit, an extraction unit, and a similarity calculation unit.

Figure 12:
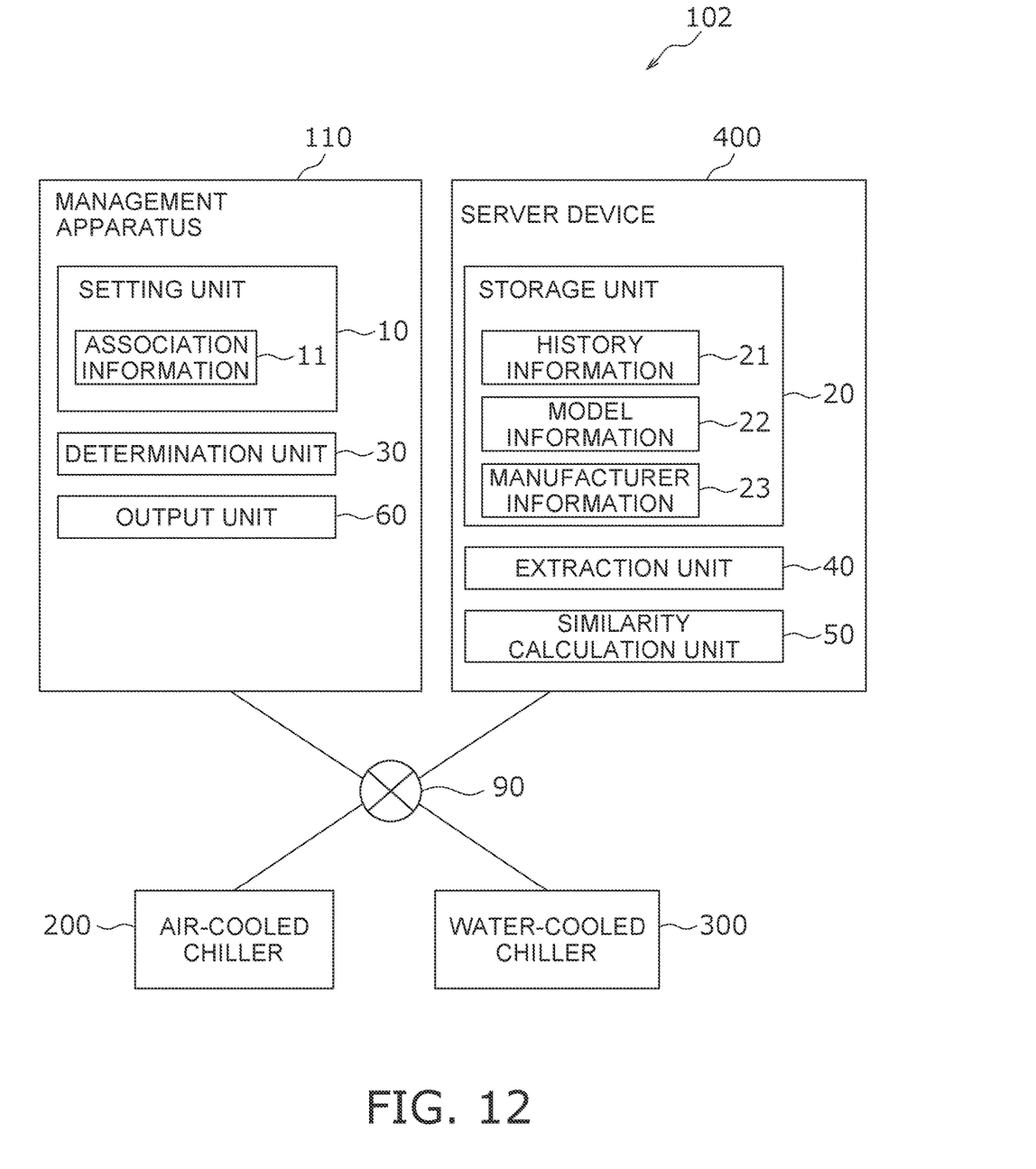
FIG. 12 is a functional block diagram of a management system.

FIG. 12 illustrates a management system 102 according to a modification 1C. The management system 102 includes a management apparatus 110, a server device 400, the air-cooled chiller 200, and the water-cooled chiller 300. The air-cooled chiller 200 and the water-cooled chiller 300 are examples of the plurality of facility devices.

The management apparatus 110 includes the setting unit 10, the determination unit 30, the output unit 60, and a control calculation unit (not illustrated). The setting unit 10 of the management apparatus 110 stores the association information.

The server device 400 includes the storage unit 20, the extraction unit 40, and the similarity calculation unit 50. The storage unit 20 of the server device 400 stores the history information 21, the model information 22, and the manufacturer information 23.

According to the modification 1C, the management apparatus 110 determines the use state of the register of the facility device, sends the information to the cloud server, and extracts the history information having high similarity from the cloud server.

(7-4) Modification 1D

In the case described according to the present embodiment, the management apparatus 100 stores the history information 21 in the storage unit 20, but is not limited thereto. A server device (cloud server) may store the history information, and the management apparatus may acquire the history information from the server device.

Figure 13:
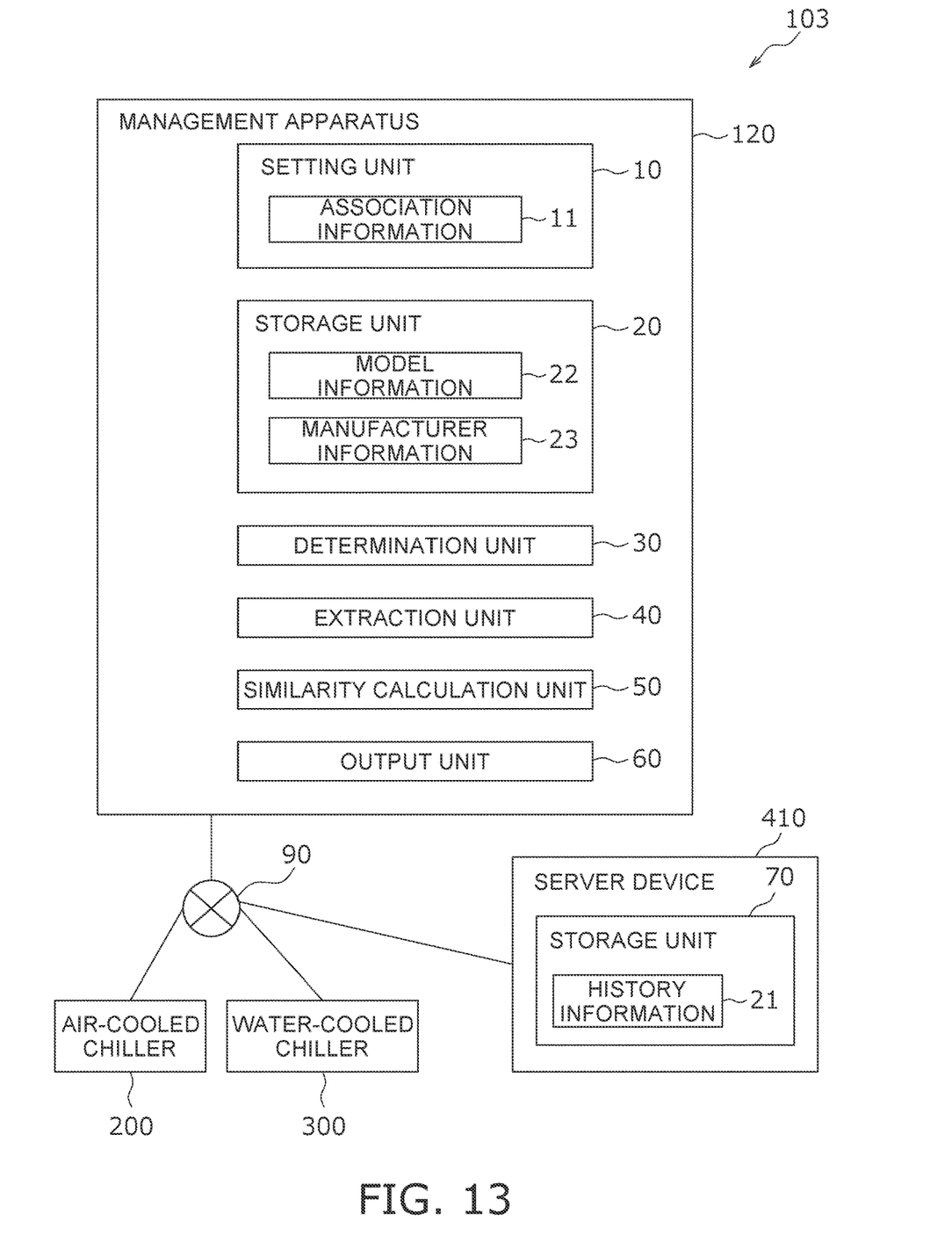
FIG. 13 is a functional block diagram of a management system.

FIG. 13 illustrates a management system 103 according to a modification 1D. The management system 103 includes a management apparatus 120, a server device 410, the air-cooled chiller 200, and the water-cooled chiller 300. The air-cooled chiller 200 and the water-cooled chiller 300 are examples of the plurality of facility devices.

The management apparatus 120 includes the setting unit 10, the storage unit 20, the determination unit 30, the extraction unit 40, the similarity calculation unit 50, the output unit 60, and a control calculation unit (not illustrated). The setting unit 10 of the management apparatus stores the association information. The storage unit 20 of the management apparatus 120 stores the model information 22 and the manufacturer information 23.

The server device 410 includes a storage unit 70. The storage unit 70 of the server device 410 stores the history information 21.

According to the modification 1D, the management apparatus 120 acquires the history information 21 stored in the cloud server. Further, the builder may send the history information from an external storage device to the management apparatus 120.

(7-5) Modification 1E

Although the embodiment of the present disclosure has been described above, it is understood that various modifications may be made to forms and details without departing from the spirit and scope of the present disclosure described in claims.

The invention claimed is:

1. A management apparatus that monitors and/or controls a plurality of facility devices each having at least one register, the management apparatus comprising:
   a setting unit configured to set association information associating identification information with a data point for each of the plurality of facility devices, the identification information specifying the at least one register used by each of the plurality of facility devices and the data point including data regarding monitoring and/or control of the each of the plurality of facility devices;
   a storage unit that stores the association information of each of the plurality of facility devices as history information;
   a determination unit configured to determine a use state of a first register in a first facility device to be subjected to communication setting; and
   an extraction unit configured to extract, from the history information, second association information of a second facility device among the plurality of facility devices that was previously stored, the extraction unit being configured to extract the second association information such that a second register of the second facility device has a use state that is identical or similar to the use state of the first register,
   the use state being a state indicating whether or not data of the data point associated with the identification information is stored for each piece of identification information,
   the management apparatus being configured to reuse a communication setting of the second facility device with respect to the first facility device.

2. The management apparatus according to claim 1, wherein
the association information includes a conversion rule in order to convert data acquired from the facility device into data suitable to monitor and/or control the facility device.

3. The management apparatus according to claim 1, wherein
the determination unit is configured to
send a request for data stored for each piece of the identification information to the first facility device and
determine the use state of the first register based on a response from the first facility device to the request.

4. The management apparatus according to claim 1, wherein
the storage unit stores the history information in association with at least manufacturer information of each of the plurality of facility devices, and
the extraction unit is configured to extract the second association information from the history information based on facility devices among the plurality of facility device that have manufacturer information identical to manufacturer information of the first facility device.

5. The management apparatus according to claim 4, wherein
the storage unit stores the history information in association with model information of each of the plurality of facility devices.

6. The management apparatus according to claim 1, further comprising:
a similarity calculation unit configured to compare first association information of the first facility device with the association information of each facility device stored in the history information to calculate a similarity of the use state of the first register with respect to each of the plurality of facility devices,
the extraction unit being configured to extract association information having a highest similarity as the second association information.

7. The management apparatus according to claim 6, wherein
the similarity calculation unit is configured to calculate the similarity based on a number of pieces of data to be newly added to the first facility device and a number of pieces of data to be deleted from the first facility device in order to make the use state of the first facility device identical to the use state of the respective facility device to which the first facility device is being compared among the plurality of facility devices.

8. The management apparatus according to claim 1, further comprising:
an output unit configured to output any of
the history information extracted by the extraction unit,
the manufacturer information and the model information associated with the history information, and
the similarity calculated by the similarity calculation unit.

9. The management apparatus according to claim 2, wherein
the determination unit is configured to
send a request for data stored for each piece of the identification information to the first facility device and
determine the use state of the first register based on a response from the first facility device to the request.

10. The management apparatus according to claim 2, wherein
the storage unit stores the history information in association with at least manufacturer information of each of the plurality of facility devices, and
the extraction unit is configured to extract the second association information from the history information based on facility devices among the plurality of facility device that have manufacturer information identical to manufacturer information of the first facility device.

11. The management apparatus according to claim 2, further comprising:
a similarity calculation unit configured to compare first association information of the first facility device with the association information of each facility device stored in the history information to calculate a similarity of the use state of the first register with respect to each of the plurality of facility devices,
the extraction unit being configured to extract association information having a highest similarity as the second association information.

12. The management apparatus according to claim 2, further comprising:
an output unit configured to output any of
the history information extracted by the extraction unit,
the manufacturer information and the model information associated with the history information, and
the similarity calculated by the similarity calculation unit.

13. The management apparatus according to claim 1, wherein
the communication setting is a test operation result.

* * * * *